I. B. PALAMOUNTAIN.
Shovel-Plow.
No. 23,942. Patented May 10, 1859.
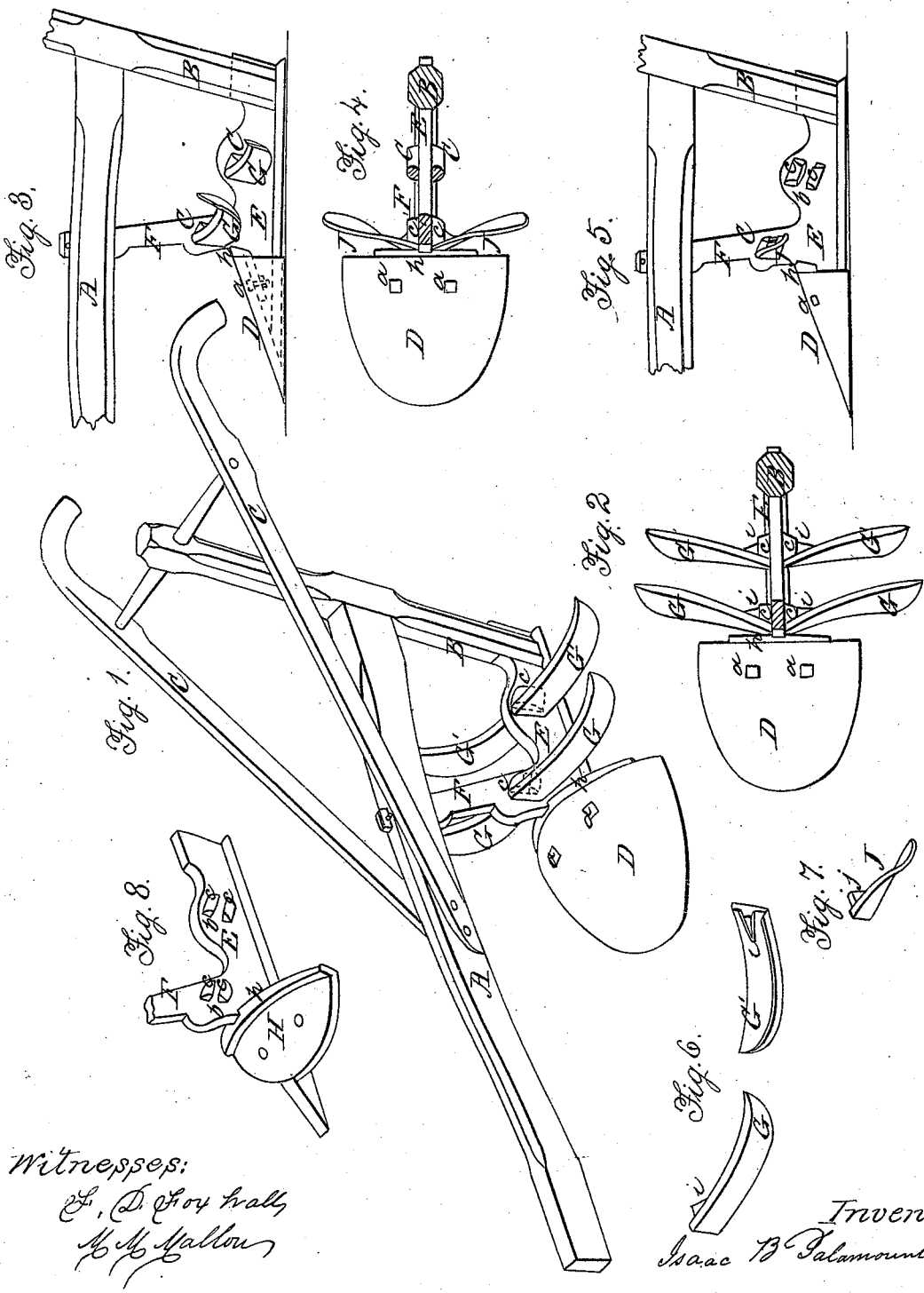
Witnesses:
Inventor:
Isaac B. Palamountain

UNITED STATES PATENT OFFICE.

ISAAC B. PALAMOUNTAIN, OF TARBOROUGH, NORTH CAROLINA.

IMPROVEMENT IN CULTIVATORS.

Specification forming part of Letters Patent No. 23,942, dated May 10, 1859.

*To all whom it may concern:*

Be it known that I, ISAAC B. PALAMOUNTAIN, of Tarborough, in the county of Edgecombe and State of North Carolina, have invented certain new and useful Improvements in Cultivators, specially adapted to cultivate cotton; and I do hereby declare the following to be a full, clear, and exact description thereof, reference being had to the accompanying drawings of the same, which make part of this specification, and in which—

Figure 1 represents a view in perspective of a cultivator embracing my improvement. Fig. 2 represents a plan of the share and removable wings. Fig. 3 represents an elevation of the cultivator having a portion of the draft-beam and handles removed. Fig. 4 represents a similar view to that shown in Fig. 2, but showing a form of wing for turning the soil and weeds over to expose the roots of the latter. Fig. 5 represents an elevation like that shown in Fig. 3, but showing the form of wing seen in Fig. 4. Fig. 6 represents views in different positions of one of the wings shown in Figs. 1, 2, and 3. Fig. 7 represents a view in perspective of one of the wings shown in Figs. 4 and 5; and Fig. 8 represents a view in perspective of the share-seat and center bar with the share and wings detached therefrom.

In the accompanying drawings, A represents the draft-beam; B, the rear standard, to which the handles C and rear end of the beam are secured; D, the share; E, the center bar; F, the standard, and G G' the wings.

The center bar, E, extends longitudinally directly beneath the beam, having its rear end secured to the stock B and its front end to the beam A by means of the standard F, which passes through said beam and is secured by a wedge. The center bar and standard F are cast in one piece, as represented in Fig. 8. The share is made convex on its upper and concave on its under side. A seat, H, is cast upon the front end of the center bar, whose upper surface is the counterpart of the under side of the share, upon which the latter is fitted and secured by bolts $a$ passing through the share and seat, having their heads countersunk in the share, and confined by nuts screwed on their lower ends against the bottom of the seat. The seat is nearly equal in width to the share, and is cast with a back or rib, $h$, rising from its rear edge, against which the share abuts, so that the top of the share is flush with the top of said back. The object of this back or rib $h$ is to relieve the screw-bolts $a$ of the great strain to which they would be liable by the resistance which the soil offers to the share, for were it not for this back support to the share the screw-bolts would be liable to be broken or bent, so that they could not easily be removed to take off the share when worn away, or when for any other cause it would be necessary to remove it from its seat. As simple as this arched support appears to be, it nevertheless serves a useful purpose in bracing the share upon its convex seat.

On each side of the center bar, and at different heights from its base, are cast boxes or projections $c$ with dovetail grooves $b$ therein, having a suitable rearward declination. These grooves are exactly on opposite sides of the bar, one pair of which being at the base of the standard F above the share, and the others occupying positions in rear of and below the top of the share.

The wings G G' (shown in Figs. 1, 2, and 6) are of the form used for breaking up the soil and gathering it round the plants. Each one is provided with a heel or tongue, $i$, on the rear side of its inner end, of a shape and size corresponding to the dovetail grooves $b$. Into these grooves the heels of the wings are fitted and held securely in place by the pressure of the soil against them, and the downward slope of the grooves, thereby dispensing with the use of screw-bolts or other fastenings to keep them in place. This is a very important advantage, because as the wings have to be frequently changed from a high to a lower elevation, or to increase or diminish their number, it would be very inconvenient to have to unscrew bolts or remove other fastenings in making these changes. The angle of that side of the wing's heel adjacent to the center bar is such as to cause the wing to extend from said bar obliquely rearward, so as to facilitate the forcing of the soil outward toward the plants as the wing advances. These wings are slightly curved on their lower edges, rounded upward at their outer ends, and so curved on their operating-faces that while the heel of the wing stands nearly vertical its outer end will be so curved as to approximate to a horizontal position, so as to allow the soil to pass over it at the same time it is being forced toward the plants. The wings may be of different lengths to suit different widths between the rows of plants, and by the method of securing them it is obvious that they can be used on one or both sides of the cultivator; or they may be removed entirely when not required for use by simply withdrawing them from their dovetail sockets.

To suit the cultivator to the condition of the crop it is only necessary to change the position of the wings and the number used. For instance, if the crop is young and requires little soil, so as not to cover it up, I use the two wings only which occupy the highest positions, so as to take hold of the upper part of the soil raised by the share and force it toward the plants; but as the crop grows it requires more soil to be thrown round its roots, and this is done by using another set or sets of wings in connection with the first, but occupying lower positions, so as to take a deeper hold upon the soil, and thus force a larger quantity toward the plants, while at the same time they loosen and break up the soil between the rows of plants. This method of increasing or diminishing the quantity thrown toward the plants, it will be seen, is not liable to cut the roots of the plants, as is the case in all other cultivators which accomplish this by adjusting wings horizontally nearer to or farther from the plant, according to its growth.

J, Figs. 4, 5, and 7, represents the form of wings which I employ to turn the soil over so as to expose the roots of the weeds preparatory to gathering the soil round the plants. They are provided with heels or tongues $j$, the counterpart of the dovetail grooves, into which the said heels are secured in the same manner as the wings shown in Fig. 6. These wings J are so curved and twisted that, while their heels will stand nearly vertical when secured in place, their outer ends will turn under, so that, instead of allowing the soil to pass over them or forcing it toward the plants, they will turn the sod and weeds over, and thus leave the roots of the weeds exposed to the sun, which soon kills them, by which the growth of the crop is not only facilitated, but the trouble of keeping the crop properly cultivated greatly lessened.

In the drawings I have represented four wings, two on each side; but I have used six, three on each side, disposed at different heights, and found them to answer the purpose well. It will be understood, however, that the number of wings used will always be governed according to the growth and condition of the crop.

Having thus fully described my invention, what I claim, and desire to secure by Letters Patent, is—

The arrangement of the beam A, stock B, center bar, B, standard F, wings G G' and J, share D, and seat H, for joint operation as set forth and described, for the purposes specified.

In testimony whereof I have hereunto subscribed my name.

ISAAC B. PALAMOUNTAIN.

Witnesses:
M. M. MALLON,
F. D. FOXHALL.